United States Patent
Ji et al.

(10) Patent No.: US 10,936,375 B2
(45) Date of Patent: Mar. 2, 2021

(54) HYPER-CONVERGED INFRASTRUCTURE (HCI) DISTRIBUTED MONITORING SYSTEM

(71) Applicant: Dell Products L.P., Round Rock, TX (US)

(72) Inventors: Lewei Ji, Shanghai (CN); Kai Chen, Shanghai (CN); Wenyu Tang, Shanghai (CN); Han Gao, Shanghai (CN); Donald Mace, Hopkinton, MA (US)

(73) Assignee: Dell Products L.P., Round Rock, TX (US)

(*) Notice: Subject to any disclaimer, the term of this patent is extended or adjusted under 35 U.S.C. 154(b) by 154 days.

(21) Appl. No.: 16/186,287

(22) Filed: Nov. 9, 2018

(65) Prior Publication Data
US 2020/0151024 A1 May 14, 2020

(51) Int. Cl.
*G06F 9/50* (2006.01)
*H04L 29/08* (2006.01)

(52) U.S. Cl.
CPC ............ *G06F 9/5083* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,575,811 B2* | 2/2017 | Farhan | H04L 67/1002 |
| 9,652,281 B2* | 5/2017 | Sethurannalingam | G06F 9/45533 |
| 10,127,080 B2* | 11/2018 | Farhan | H04L 67/1002 |
| 10,334,040 B2* | 6/2019 | Shanley | H04L 67/1061 |
| 10,489,215 B1* | 11/2019 | Wen | G06F 11/3442 |
| 2010/0169893 A1* | 7/2010 | Collins | H04L 12/1453 718/105 |
| 2019/0012092 A1* | 1/2019 | Bower, III | H04L 67/1097 |
| 2019/0087220 A1* | 3/2019 | Turner | G06F 9/545 |
| 2019/0087244 A1* | 3/2019 | Turner | G06F 16/2379 |
| 2019/0327144 A1* | 10/2019 | Tembey | H04L 41/5048 |
| 2019/0370079 A1* | 12/2019 | Ramesh | G06F 3/061 |

OTHER PUBLICATIONS

Prabowo et al. "The Determinants of User's Intention to Adopt Hyper-Converged Infrastructure Technologies: An Integrated Approach," 2018 IEEE, pp. 306-311.*

* cited by examiner

*Primary Examiner* — Van H Nguyen
(74) *Attorney, Agent, or Firm* — Haynes and Boone, LLP

(57) ABSTRACT

A Hyper-Converged Infrastructure (HCI) monitoring system includes server devices that each provide a respective HCI system that is part of an HCI cluster. A communication queue and a manager subsystem are provided on at least one of the server devices. The manager subsystem provides, in the communication queue, first workload code that is configured to run on a first server device and that is associated with a first HCI system identifier for a first HCI system provided by the first server device. The first HCI system accesses the communication queue, retrieves the first workload code in response to the first workload code being associated with the first HCI system identifier, executes the first workload code, and provides associated results to the communication queue. The manager subsystem retrieves, from the communication queue, the first results, and reports at least one of the first results to an administrator device.

17 Claims, 9 Drawing Sheets

HYPER-CONVERGED INFRASTRUCTURE (HCI) DISTRIBUTED MONITORING SYSTEM

BACKGROUND

The present disclosure relates generally to information handling systems, and more particularly to providing for distributed monitoring of Hyper-Converged Infrastructure (HCI) systems provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are sometimes utilized to provide Hyper-Converged Infrastructure (HCI) systems. HCI systems provide a software-defined Information Technology (IT) infrastructure that virtualizes the elements of conventional hardware-defined systems, including virtualized computing (e.g., via a hypervisor), virtualized storage (e.g., via a software-defined Storage Area Network (SAN)), virtualized networking (e.g., via software-defined networking), and/or other HCI components known in the art. HCI systems may be provided in HCI clusters (i.e., that include a plurality of HCI systems) that allow for the provisioning of data and workloads that utilize that data across the HCI cluster. It is often desirable to monitor the HCI cluster, the HCI systems, the applications in the workloads run by the HCI systems, and/or other components in the HCI cluster in order to, for example, ensure that the health and proper operation of the system. However, conventional HCI monitoring systems suffer from a number of issues.

For example, the HCI clusters discussed above may be heterogeneous due to, for example, the HCI systems being provided by server devices (or other hardware) that are different from each other (e.g., because they are manufactured by different manufacturers.) In order to provide for the monitoring of such heterogeneous HCI clusters, monitoring software is created that includes code and/or scripts necessary to provide monitoring functionality on each of the different server devices (or other hardware) that are used to provide the HCI systems in the HCI clusters. That monitoring software is then provided on each of the server devices/HCI systems in the HCI cluster, and a hardware detection code switch is typically utilized with the monitoring software to determine the type of server device/hardware is being used to provide the HCI system upon which that monitoring software is running, and select the appropriate code in the monitoring software that should be executed on that server device/hardware in order to enable the monitoring functionality. As such, many server devices/HCI systems are provided code in the monitoring software that is redundant and/or not used by that server device/HCI system, which wastes resources in the server device/HCI system and puts those server devices/HCI systems at the risk of regression (e.g., the loss of particular monitoring functionality following a system software upgrade or patch). Furthermore, conventional HCI monitoring systems require that all the server devices/HCI systems incorporate monitoring software upgrades, resulting in longer HCI system down-times and relatively large bandwidth requirements for monitoring software upgrades.

Accordingly, it would be desirable to provide an improved HCI monitoring system.

SUMMARY

According to one embodiment, an Information Handling System (IHS) includes a processing system; and a memory system that is coupled to the processing system and that includes instructions that, when executed by the processing system, cause the processing system to provide a manager engine that is configured to: provide, in a communication queue, first workload code that is configured to run on a first server device and that is associated with a first HCI system identifier for a first HCI system provided by the first server device, wherein the first HCI system identifier is configured to identify to the first HCI system to retrieve the first workload code from the communication queue and execute that first workload code to generate one or more first results; retrieve, from the communication queue, the one or more first results generated by the first HCI system and provided by the first HCI system to the communication queue; and report, to an administrator device, at least one of the one or more first results provided by the first HCI system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
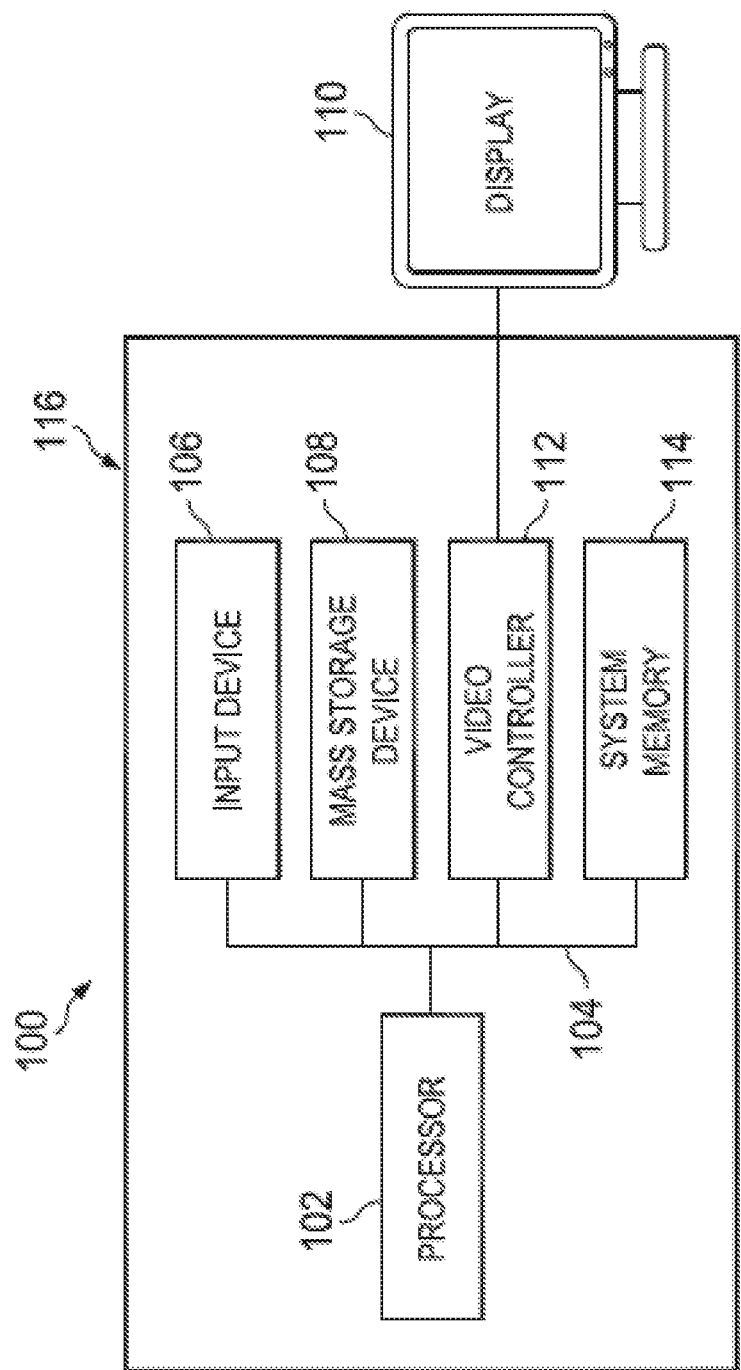
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
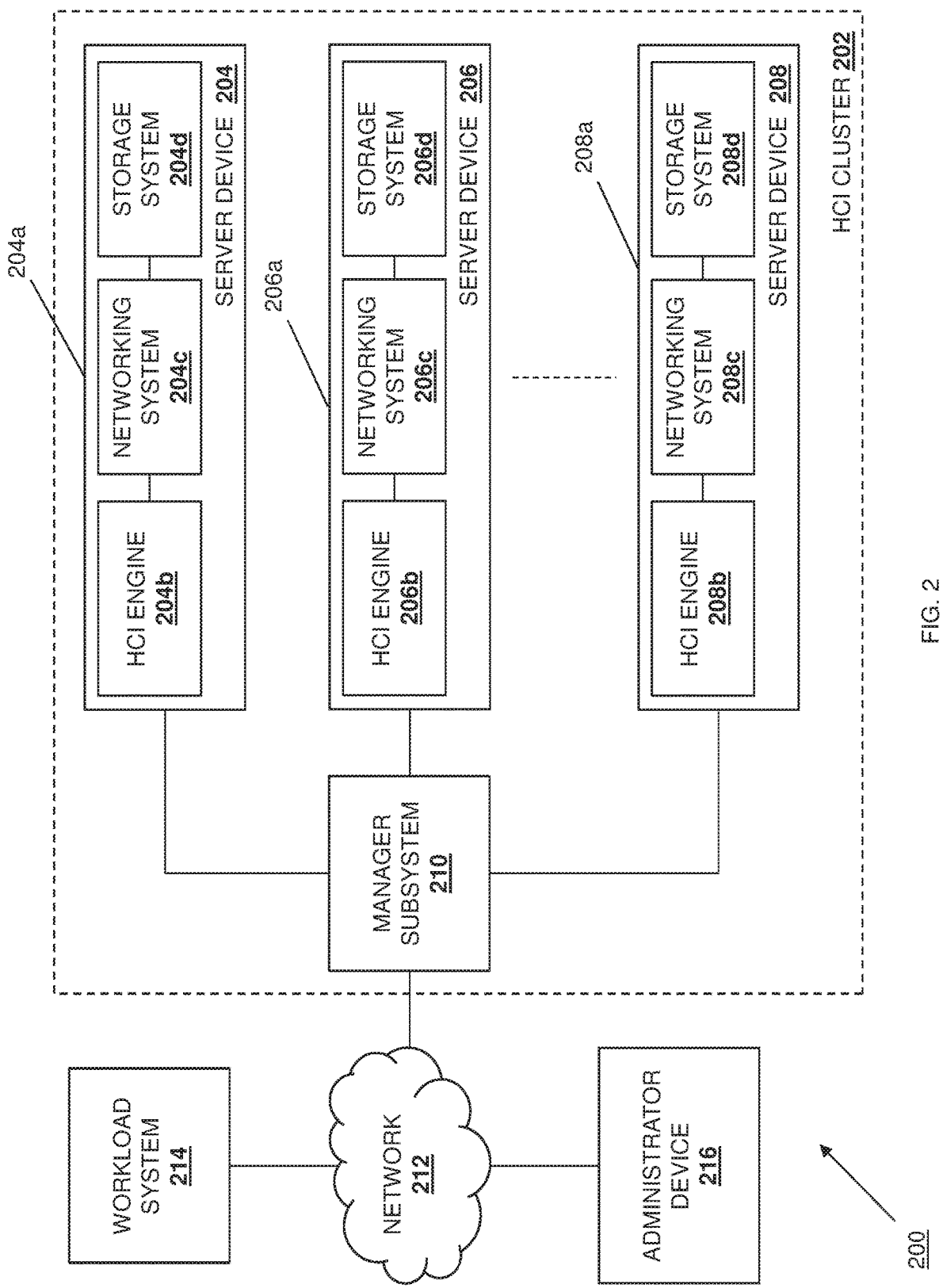
FIG. 2 is a schematic view illustrating an embodiment of a network including an HCI cluster that may be monitored according to the teachings of the present disclosure.

Referring now to FIG. 2, an embodiment of a network 200 is illustrated that operates according to the teachings of the present disclosure. In the illustrated embodiment, the network 200 includes a Hyper-Converged Infrastructure (HCI) cluster 202 having a plurality of HCI systems that are provided by the server devices 204, 206, and up to 208 in the examples below. In many embodiments, any or all of the server devices 204-208 may be provided by the IHS 100 discussed above with reference to FIG. 1, and/or may include some or all of the components of the IHS 100. As discussed above, the server devices 204-208 of the present disclosure are utilized to provide HCI systems that each include a software-defined Information Technology (IT) infrastructure that virtualizes the elements of conventional hardware-defined systems, including virtualized computing (e.g., via a hypervisor), virtualized storage (e.g., via a software-defined Storage Area Network (SAN)), virtualized networking (e.g., via software-defined networking), and/or other HCI components known in the art. The provisioning of the HCI systems provided by the server devices 204-208 in the HCI cluster 202 allows for the provisioning of data and workloads that utilize that data across the HCI cluster 202. However, while illustrated and described as being provided by server devices, HCI systems may be provided by a variety of computing devices and/or hardware while remaining within the scope of the present disclosure as well. Furthermore, while a single HCI cluster 202 is illustrated and described below, networks that include multiple HCI clusters similar to the HCI cluster 202 will fall within the scope of the present disclosure as well.

In the illustrated embodiment, the server device 204 includes a chassis 204a that houses the components of the server device 204, only some of which are illustrated in FIG. 2. For example, the chassis 204a may house a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide an HCI engine 204b that is configured to provide the HCI systems and perform any of the functionality of those HCI systems discussed below. The chassis 204a may also house a networking system 204c that is coupled to the HCI engine 204b (e.g., via a coupling between the networking system 204c and the processing system) and that may include a Network Interface Controller (NIC), a wireless communication system (e.g., a BLUETOOTH® communication system, a Near Field Communication (NFC) system, a WiFi communication system, etc.), and/or other communication components that would be apparent to one of skill in the art in possession of the present disclosure.

The chassis 204a may also house a storage system 204d that is coupled to the HCI engine 204b (e.g., via a coupling between the storage system 204d and the processing system) and that may include direct-attached storage device(s) such as Hard Disk Drive(s) (HDD(s)), a Solid State Drive(s) (SSD(s)), and/or other direct-attached storage devices that would be apparent to one of skill in the art in possession of the present disclosure. In a particular example, the HCI engine 204b may be configured to virtualize the elements of conventional hardware-defined systems as discussed above, including virtualized computing (e.g., via a hypervisor using the processing system/memory system), virtualized storage (e.g., via a software-defined Storage Area Network (SAN) using the storage system 204d), virtualized networking (e.g., via software-defined networking using the networking system 204c), and/or other HCI components known in the art. While a specific server device 204 has been illustrated and described, one of skill in the art in possession of the present disclosure will recognize that server devices may include a variety of components other than those illustrated in order to provide conventional server device functionality, as well as the functionality discussed below, while remaining within the scope of the present disclosure.

Similarly, the server device 206 includes a chassis 206a that houses the components of the server device 206, only some of which are illustrated in FIG. 2. For example, the chassis 206a may house a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide an HCI engine 206b that is configured to provide the HCI systems and perform any of the functionality of those HCI systems discussed below. The chassis 206a may also house a networking system 206c that is coupled to the HCI engine 206b (e.g., via a coupling between the networking system 206c and the processing system) and that may include a Network Interface Controller (NIC), a wireless communication system (e.g., a BLUETOOTH® communication system, a Near Field Communication (NFC) system, a WiFi communication system, etc.), and/or other communication components that would be apparent to one of skill in the art in possession of the present disclosure.

The chassis 206a may also house a storage system 206d that is coupled to the HCI engine 206b (e.g., via a coupling between the storage system 206d and the processing system) and that may include direct-attached storage device(s) such as Hard Disk Drive(s) (HDD(s)), a Solid State Drive(s) (SSD(s)), and/or other direct-attached storage devices that would be apparent to one of skill in the art in possession of the present disclosure. In a particular example, the HCI engine 206b may be configured to virtualize the elements of conventional hardware-defined systems as discussed above, including virtualized computing (e.g., via a hypervisor using the processing system/memory system), virtualized storage (e.g., via a software-defined Storage Area Network (SAN) using the storage system 206d), virtualized networking (e.g., via software-defined networking using the networking system 206c), and/or other HCI components known in the art. While a specific server device 206 has been illustrated and described, one of skill in the art in possession of the present disclosure will recognize that server devices may include a variety of components other than those illustrated in order to provide conventional server device functionality, as well as the functionality discussed below, while remaining within the scope of the present disclosure.

Similarly, the server device 208 includes a chassis 208a that houses the components of the server device 208, only some of which are illustrated in FIG. 2. For example, the chassis 208a may house a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide an HCI engine 208b that is configured to provide the HCI systems and perform any of the functionality of those HCI systems discussed below. The chassis 208a may also house a networking system 208c that is coupled to the HCI engine 208b (e.g., via a coupling between the networking system 208c and the processing system) and that may include a Network Interface Controller (NIC), a wireless communication system (e.g., a BLUETOOTH® communication system, a Near Field Communication (NFC) system, a WiFi communication system, etc.), and/or other communication components that would be apparent to one of skill in the art in possession of the present disclosure.

The chassis 208a may also house a storage system 208d that is coupled to the HCI engine 208b (e.g., via a coupling between the storage system 208d and the processing system) and that may include direct-attached storage device(s) such as Hard Disk Drive(s) (HDD(s)), a Solid State Drive(s) (SSD(s)), and/or other direct-attached storage devices that would be apparent to one of skill in the art in possession of the present disclosure. In a particular example, the HCI engine 208b may be configured to virtualize the elements of conventional hardware-defined systems as discussed above, including virtualized computing (e.g., via a hypervisor using the processing system/memory system), virtualized storage (e.g., via a software-defined Storage Area Network (SAN) using the storage system 208d), virtualized networking (e.g., via software-defined networking using the networking system 208c), and/or other HCI components known in the art. While a specific server device 208 has been illustrated and described, one of skill in the art in possession of the present disclosure will recognize that server devices may include a variety of components other than those illustrated in order to provide conventional server device functionality, as well as the functionality discussed below, while remaining within the scope of the present disclosure In the illustrated embodiment, the HCI cluster 202 also includes a manager subsystem 210 that is coupled to each of the HCI systems provided by the respective server devices 204-208. In some examples, the manager subsystem 210 may be provided by one or more server devices (separate from the server devices 204-208) that include a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide a manager engine that is configured to perform the functions of the manager engines and manager subsystems discussed below. In many embodiments, a server device that provides the manager subsystem 210 may be provided by the IHS 100 discussed above with reference to FIG. 1, and/or may include some or all of the components of the IHS 100.

However, in other examples, the manager subsystem 210 may be provided by one or more of the server devices 204-208 that also provide the HCI systems in the HCI cluster 202 (e.g., the server devices 204, 206, and/or 208 may include a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide a manager engine that is configured to perform the functions of the manager engines and manager subsystems discussed below). In a specific example, redundant instances of the manager subsystem 210 are provided on two or more of the server devices 204, 206, and up to 208 (e.g., a primary manager engine may be provided on the server device 204 and configured to perform any of the functionality of the manager engines/manager subsystems discussed below, while a redundant manager engine may be provided on the server device 206 and configured to perform any of the functionality of the manager engines/manager subsystems discussed below in the event the primary manager engine becomes unavailable due to, for example, an unavailability of the server device 204.) However, while specific examples of the provisioning of the manager subsystem 210 in the HCI cluster 202 have been illustrated and described, one of skill in the art in possession of the present disclosure will recognize that the functionality of the manager subsystem 210 described herein may be provided by a variety of devices and/or components in the network 200 while remaining within the scope of the present disclosure as well.

In the illustrated embodiment, the manager subsystem 210 is coupled to a network 212 that may be provided by a Local Area Network (LAN), the Internet, and/or a variety of other networks that would be apparent to one of skill in the art in possession of the present disclosure. Furthermore, a workload system 214 is coupled to the network 212, and may be provided by one or more server devices, storage devices, and/or other components that are configured to store workloads and provide those workloads to the manager subsystem 210 for provisioning on the HCI cluster 202. In many embodiments, the server device(s), storage device(s), and/or other components that provide the workload system 214 may be provided by the IHS 100 discussed above with reference to FIG. 1, and/or may include some or all of the components of the IHS 100. Further still, an administrator device 216 is coupled to the network 212 and may be provided by the IHS 100 discussed above with reference to FIG. 1, and/or may include some or all of the components of the IHS 100. While a specific network 200 implementing the HCI distributed monitoring system of the present disclosure has been illustrated and described, one of skill in the art in possession of the present disclosure will recognize that HCI distributed monitoring systems according to the teachings of the present disclosure may include a variety of different components and/or component configurations while remaining within the scope of the present disclosure as well.

Figure 3:
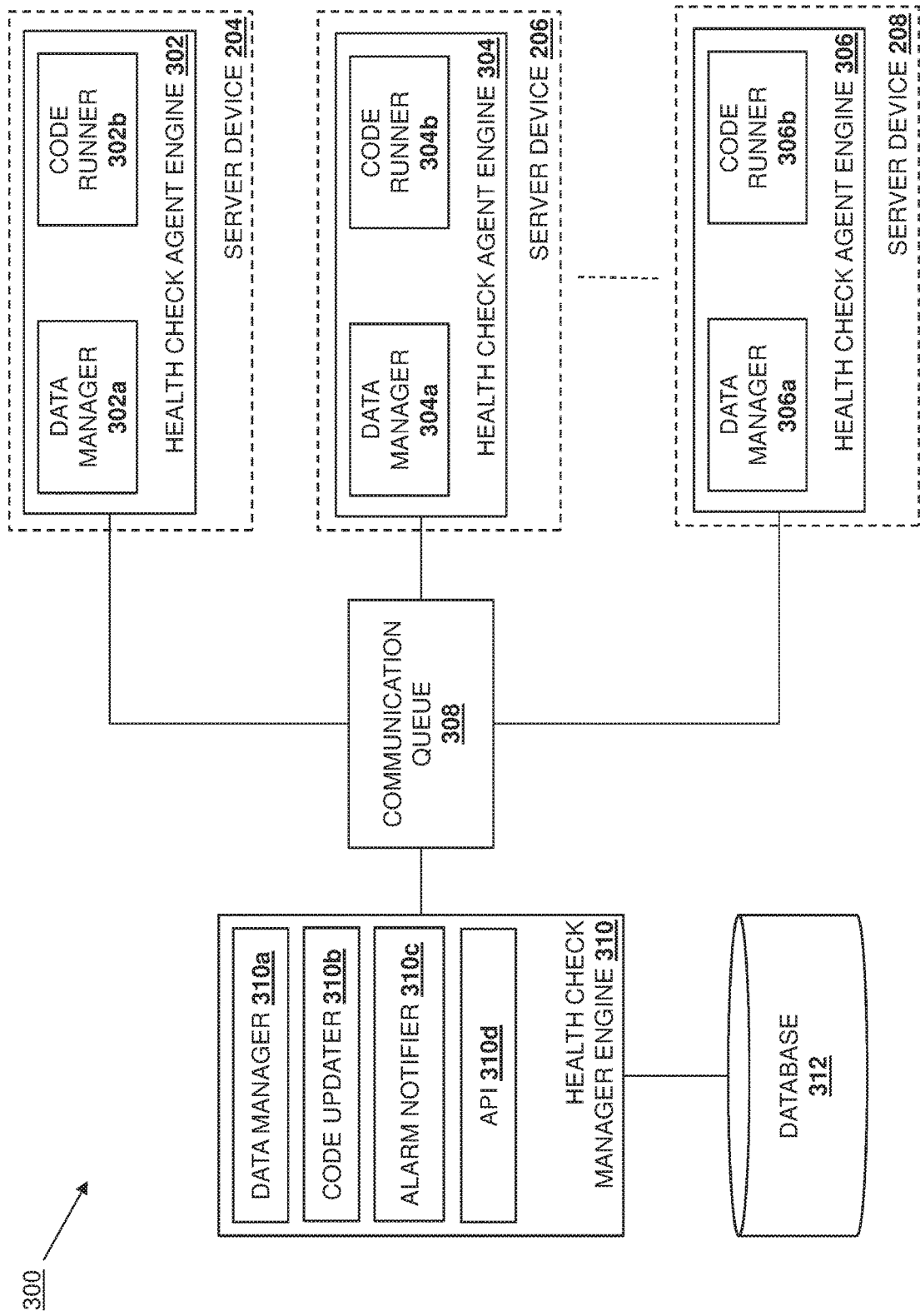
FIG. 3 is a schematic view illustrating an embodiment of an HCI monitoring system that may be provided on the HCI cluster of FIG. 2.

Referring now to FIG. 3, an embodiment of an HCI distributed monitoring system 300 provided on the HCI cluster 202 of FIG. 2 is illustrated. In the illustrated embodiment, the server device 204 may include a processing system (e.g., the processor 102 discussed above with reference to FIG. 1) and a memory system (e.g., the memory 114 discussed above with reference to FIG. 1) that is coupled to the processing system and that includes instructions that, when executed by the processing system, cause the processing system to provide a heath check agent engine 302 that may be part of the HCI system provided on the server device 204. Similarly, the server device 206 may provide a heath check agent engine 304 that may be part of the HCI system provided on the server device 206, and the server device 208 may provide a heath check agent engine 306 that may be part of the HCI system provided on the server device 208. Each of the health check agent engines 302-306 are coupled to a communication queue 308 that may be provided by the manager subsystem 210, which as discussed above may be provided on one or more of the server devices 204-208. In a specific example, the health check agent engines 302-306 may be provided by an ESXI hypervisor-enabled operating system provided by VMWare, Inc. of Palo Alto, Calif., United States, although other components for providing the health check agent engines will fall within the scope of the present disclosure as well.

In the illustrated embodiment, each of the health check agent engines 302, 304, and 306 include respective data managers 302*a*, 304*a*, and 306*a*, and respective code runners 302*b*, 304*b*, and 306*b*, each of which may be configured to perform the functions of the data managers, code runners, and health check agent engines discussed below, which generally includes the data managers 302*a*-306*a* retrieving heartbeat communications from the communication queue 308 and providing heartbeat communication responses to the communication queue 308, as well as the data managers 302*a*-306*a* retrieving code from the communication queue 308, providing that code to the code runners 302*b*-306*b*, respectively, so that the code runners 302*b*-306*b* can execute the code, receiving the results of the execution of the code from the code runners 203*b*-306*b*, providing results from the execution of code to the communication queue 308. In a specific example, the code runners 302*b*-306*b* may be provided by a variety of code/scripting engines that would be apparent to one of skill in the art in possession of the present disclosure as providing a vehicle for running code/scripts in any of a variety of code/scripting languages (e.g., shell scripts or other scripts known in the art.) In an embodiment, the communication queue 308 may be provided by middleware, and generally operates to provide for the exchange of heartbeat communications, distribute code to HCI systems provided on the different server devices 204-206, as well as provide for the transmission of the results of the execution of that code, and/or other data transmission operations that would be apparent to one of skill in the art in possession of the present disclosure.

In the illustrated embodiment, the manager subsystem 210 may include a processing system (e.g., the processor 102 discussed above with reference to FIG. 1) and a memory system (e.g., the memory 114 discussed above with reference to FIG. 1) that is coupled to the processing system and that includes instructions that, when executed by the processing system, cause the processing system to provide a health check manager engine 310 that is coupled to the communication queue 308. In a specific example, the health check manager engine 310 may be provided by a VxRail HCI appliance provided by DELL® Inc. of Round Rock, Tex., United States, although other health check manager engines will fall within the scope of the present disclosure as well. In the illustrated example, the health check manager engine 310 includes a data manager 310*a* that is configured to send and receive communications from the communication queue 308, including exchanging heartbeat communications with the HCI systems via the communication queue 308, pushing code to each HCI system via the communication queue, collecting the results from the execution of code provided to the message queue 308 by those HCI systems, etc.

The health check manager engine 310 also includes a code updater 310*b* that is configured to determine whether an HCI system needs a code update, and provide code update to those HCI systems via the communication queue 308. The health check manager engine 310 also includes an alarm notifier 310*c* that is configured to provide alarms based on the results of the execution of code retrieved from the communication queue 308. The health check manager engine 310 also includes an API 310*d* (e.g., a REST API) that, while not discussed in detail below, may be configured to provide access to metering data, health status data, and/or other data in a database 312 that is coupled to the health check manager engine 310. Furthermore, the database 312 may store the identities of each of the HCI systems/server devices in the HCI cluster 202, as well as code/script types and code/script contents in association with the HCI identifiers for each HCI system/server device. While a specific HCI distributed monitoring system 300 has been illustrated, one of skill in the art in possession of the present disclosure will recognize that HCI distributed monitoring systems according to the teachings of the present disclosure may include a variety of different components and/or component configurations while remaining within the scope of the present disclosure as well.

Figure 4:
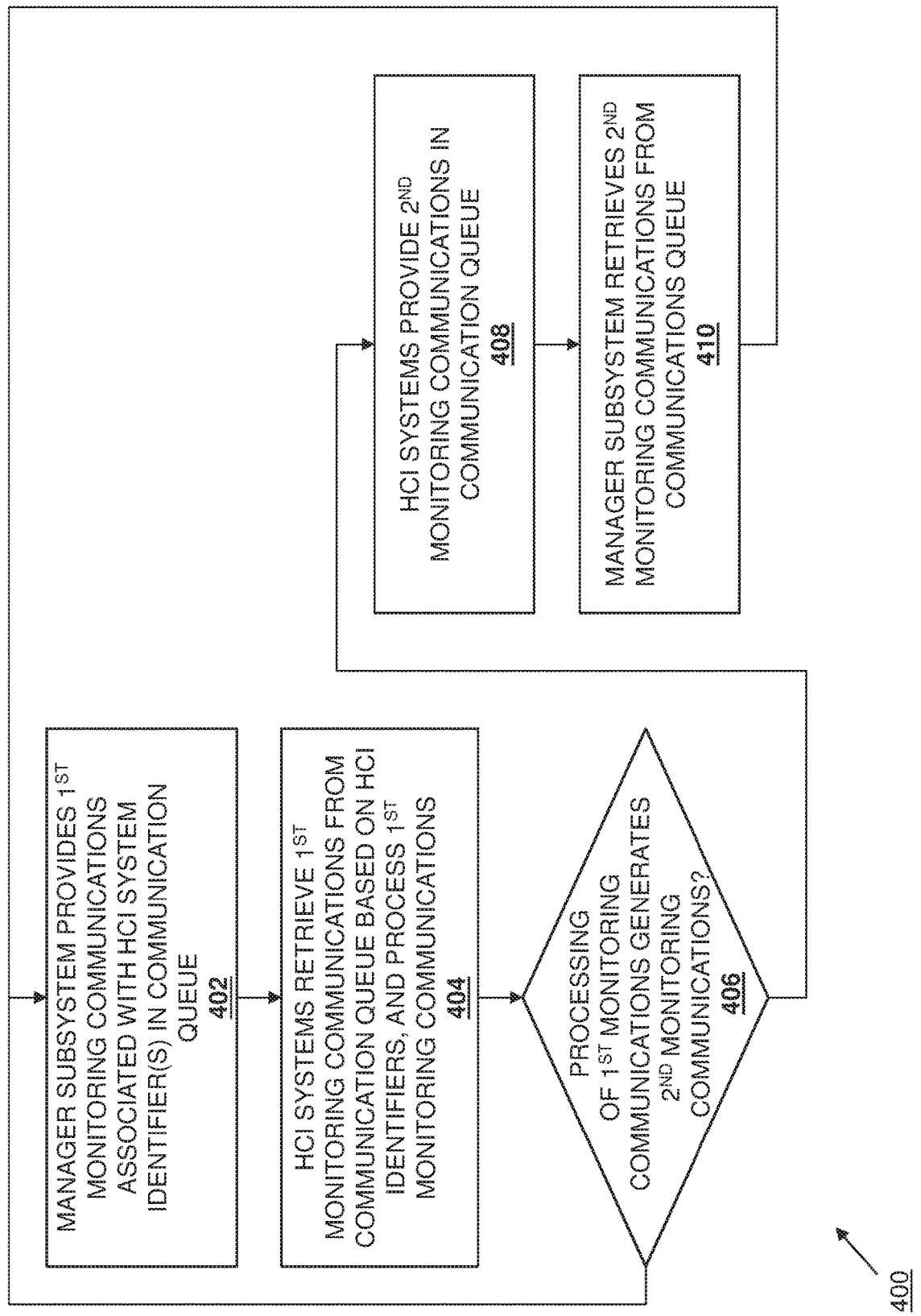
FIG. 4 is a flow chart illustrating an embodiment of a method for monitoring an HCI cluster.

Referring now to FIG. 4, an embodiment of a method 400 for monitoring an HCI cluster is illustrated. As discussed below, the systems and methods of the present disclosure include communication queue middleware that exists between HCI systems provided on respective server devices and a management subsystem that monitors those HCI systems. In the specific examples discussed below, the monitoring of the HCI systems includes health check monitoring, with the manager subsystem providing a health check manager that provides code and/or other communications in the communication queue, and associates those communications with identifiers for the HCI systems that are meant to consume those communications. The HCI systems includes health check agents that monitor the communication queue for communications associated with the identifier for their respective HCI systems, and retrieve those communications when they are associated with the identifier for their respective HCI systems. As such, the health check agents may retrieve code that was provided in the communication queue by the heath check manager for their particular HCI system and that may be configured to function with the particular server device that provides their HCI system. The health check agents may then execute the code to produce results, and then provide those results in the communication queue for retrieval by the health check manager.

As such, a centralized health check manager may distribute code to different HCI systems provided on server devices manufactured by different manufacturers without the need to provide redundant code on any of those HCI systems/server devices, and retrieve results from the execution of that code in an efficient manner as well, via the communication queue middleware that prevents issues such as application coupling (e.g., by processing the same message via the message queue between multiple applications, which can avoid the failure of the calling interface that can cause the entire process to fail), asynchronous messages (e.g., by having multiple applications process the same message in the message queue and concurrently process messages between applications, reducing processing time relative to serial processing systems), and traffic clipping (e.g., which may avoid situations where the application system hangs due to excessive traffic) that occur in conventional systems.

The method 400 begins at block 402 where a manager subsystem provides first monitoring communications associated with HCI system identifier(s) in a communication queue. In an embodiment, at block 402, the heath check manager engine 310 provided on the manager subsystem 210 may provide a variety of monitoring communications associated with HCI system identifiers in the communication queue 308. For example, the data manager 310a in the health check manager engine 310 may operate at block 402 to generate and provide heartbeat communications in the communication queue 308 in association with HCI identifier(s) for any HCI system provided on the server device(s) 204-208 and included in the HCI cluster 202. As discussed below, and as would be understood by one of skill in the art in possession of the present disclosure, heartbeat communications may include "keep-alive" signals between the heath check manager engine 310 and any component being monitored (e.g., the health check agent engines 302-306 provided on the HCI systems in the HCI cluster 202). As such, heartbeat communications or other keep-alive signals used by the health check manager engine 310 may be placed in the communication queue 308 and tagged with an identifier for the components that are being monitored and that are expected to respond to those heartbeat communications.

Figure 5:
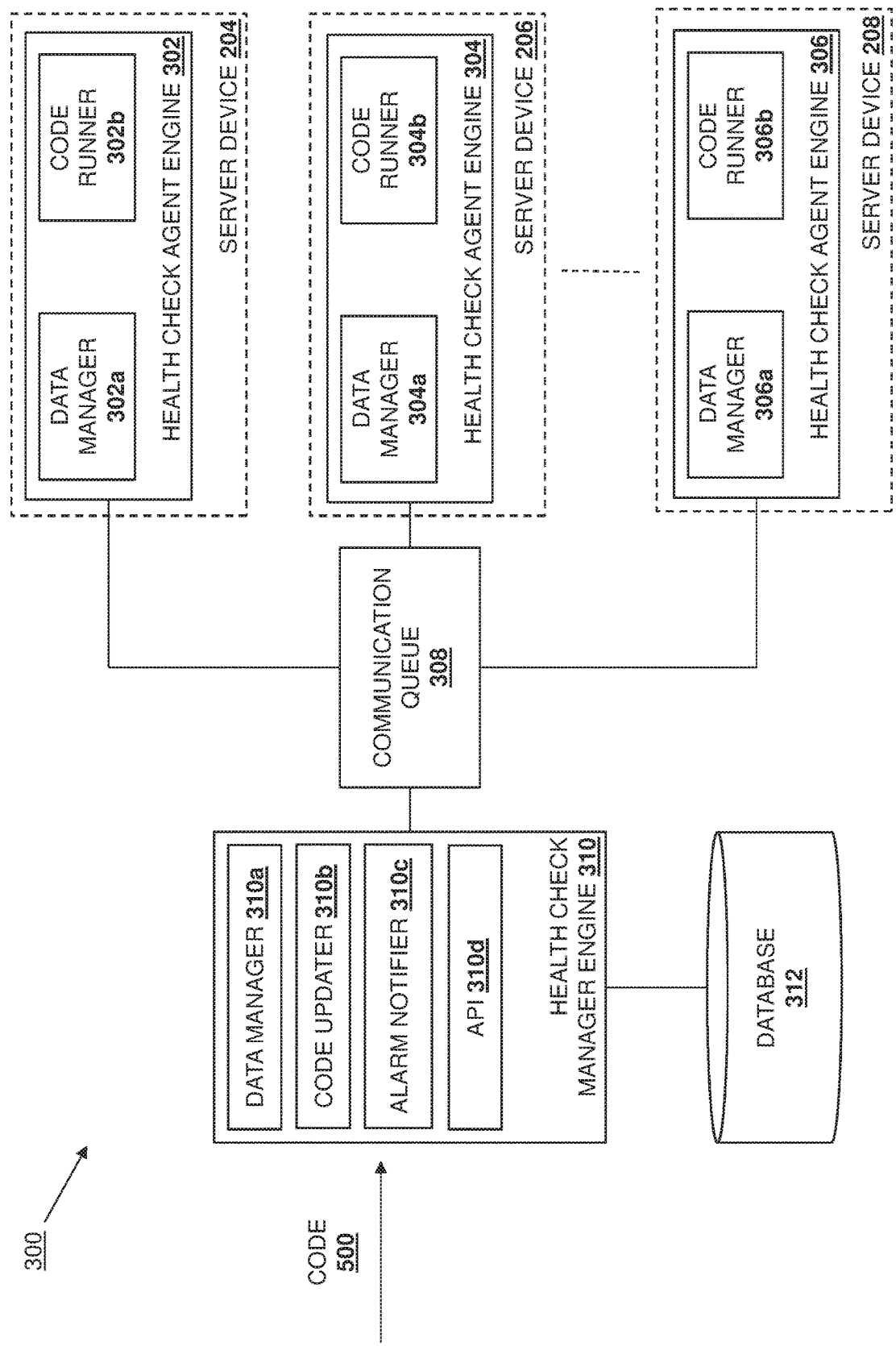
FIG. 5 is a schematic view illustrating an embodiment of monitoring functionality provided in the monitoring system of FIG. 3.
Figure 6:
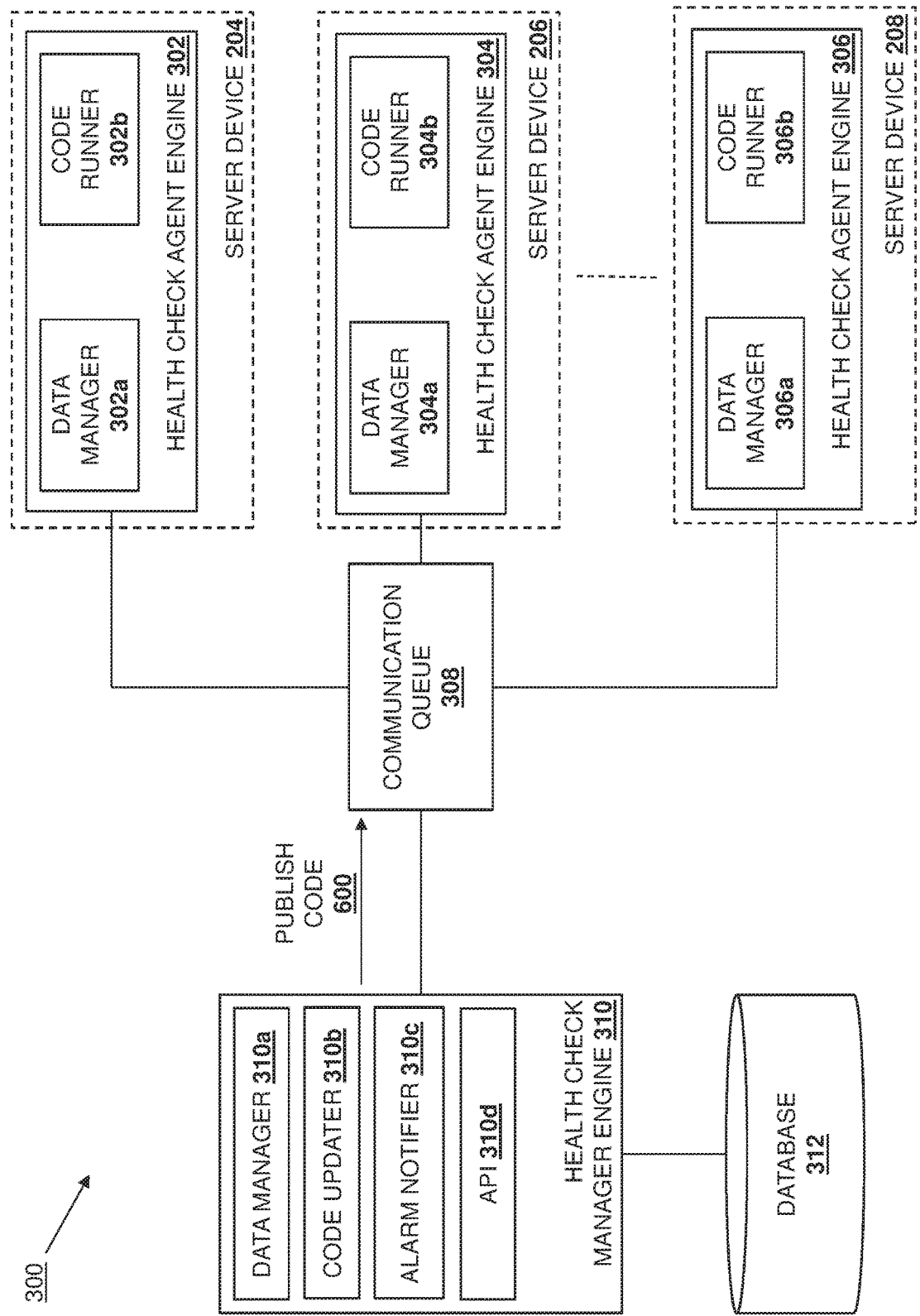
FIG. 6 is a schematic view illustrating an embodiment of monitoring functionality provided in the monitoring system of FIG. 3.

In another example, the data manager 310a in the health check manager engine 310 may operate at block 402 to provide code in the communication queue 308 in association with HCI identifier(s) for any HCI system provided on the server device(s) 204-208 and included in the HCI cluster 202. For example, with reference to FIG. 5, at or prior to block 402, the health check manager engine 310 may receive code 500, workload scripts, and/or other software instructions that are configured to be provided on one or more of the server devices 204-208 used to provide the HCI systems in the HCI cluster 202. As discussed above, the HCI cluster 202 may be heterogeneous due to, for example, the HCI systems being provided by the server devices 204-208 (or other hardware) that are different from each other (e.g., because they are manufactured by different manufacturers.) As such, the code 500 received at or prior to block 402 may be configured to provide monitoring functionality to a first subset of the server devices 204-208 (or other hardware) used to provide a first subset of the HCI systems in the HCI cluster 202, while not being configured to be functional on a second subset of the server devices 204-208 (or other hardware) used to provide a second subset of the HCI systems in the HCI cluster 202. In some examples, the code 500 may be new code (e.g., a health check workload script) that is configured to provide new monitoring functionality to the first subset of the server devices 204-208 (or other hardware) used to provide the first subset of the HCI systems in the HCI cluster 202. As such, with reference to FIG. 6, at block 402 the health check manager engine 310 may publish code 600 that is configured to be provided on one or more of the server devices 204-208 used to provide the HCI systems in the HCI cluster 202, along with the identifier(s) for the HCI system(s) that are intended to consume that code. As such, code written for particular server devices (or other hardware) may be published to the communication queue 308 and designated for particular HCI systems provided on particular server devices for which that code was written, while not being designated for HCI systems provided on particular server devices that cannot provide for the execution of that code.

In other embodiments, the code 500 may be a code update that is configured to update monitoring functionality to the first subset of the server devices 204-208 (or other hardware) used to provide the first subset of the HCI systems in the HCI cluster 202. For example, the code updater 310b in the health check manager engine 310 may be configured to determine whether one or more HCI systems provided on the server device(s) 204-208 and included in the HCI cluster 202 should have their code updated and, if so, provide the code update in the communication queue 308 via the publish code 600 action illustrated in FIG. 6. As discussed below, in some specific examples, the code update may include an upgrade payload that is configured to upgrade the data manager, code runner, and/or other components of the health check agent engines in the HCI systems. In a specific example, the publishing of the monitoring communications may include pushing the heartbeat communications, health check workload scripts, upgrade payloads, and/or any other monitoring communications discussed above along with the associated HCI system identifiers via asynchronous Advanced Messaging Queue Protocol (AMQP) transmissions.

The method 400 then proceeds to block 404 where HCI system(s) retrieve the first monitoring communications from the communication queue based on the HCI identifier(s), and process the first monitoring communications. In an embodiment, at block 404, each of the HCI systems provided on the server device(s) 204-208 and included in the HCI cluster 202 may operate to monitor and/or periodically check the communication queue 308 for communications that were provided by the health check manager engine 310 and that are associated with their respective HCI system identifier. For example, the data manager 302a-306a in any or all of the health check agent engines 302-306, respectively, may operate at block 404 to access the communication queue 308, determine when communications are provided by the health check manager engine 310 are included in the communication queue 308, and identify if those communication include an HCI system identifier for their respective HCI system. When a data manager 302a-c in a health check agent engine 302-306, respectively, determines that the communication queue 308 includes a communication with an HCI system identifier for their respective HCI system, that health check agent will retrieve that communication, and may pass that communication to its corresponding code runner 302b-306b for execution.

In one example, as discussed above, at block 402 the heath check manager engine 310 may have generated and provided heartbeat communications in the communication queue 308 in association with HCI identifier(s) for the HCI systems provided on the server devices 204 and 206. As such, at block 404, the data managers 302a and 306a in the health check agent engines 302 and 306, respectively, may have identified those heartbeat communications, determined that those heartbeat communications were associated with HCI system identifiers for their respective HCI systems and, in response, retrieved those heartbeat communications. In some embodiments, the data managers 302a and 306a may the pass the heartbeat communications to their corresponding code runners 302b and 306b in the health check agent engines 302 and 306, and the code runners 302b and 306b will process those heartbeat communications by, for example, generating heartbeat communications that respond to those heartbeat communications. However, in other embodiments, the data managers 302a and 306a may process those heartbeat communications (i.e., without the code runners 302b and 306b) by, for example, generating heartbeat communications that respond to those heartbeat communications.

Figure 7:
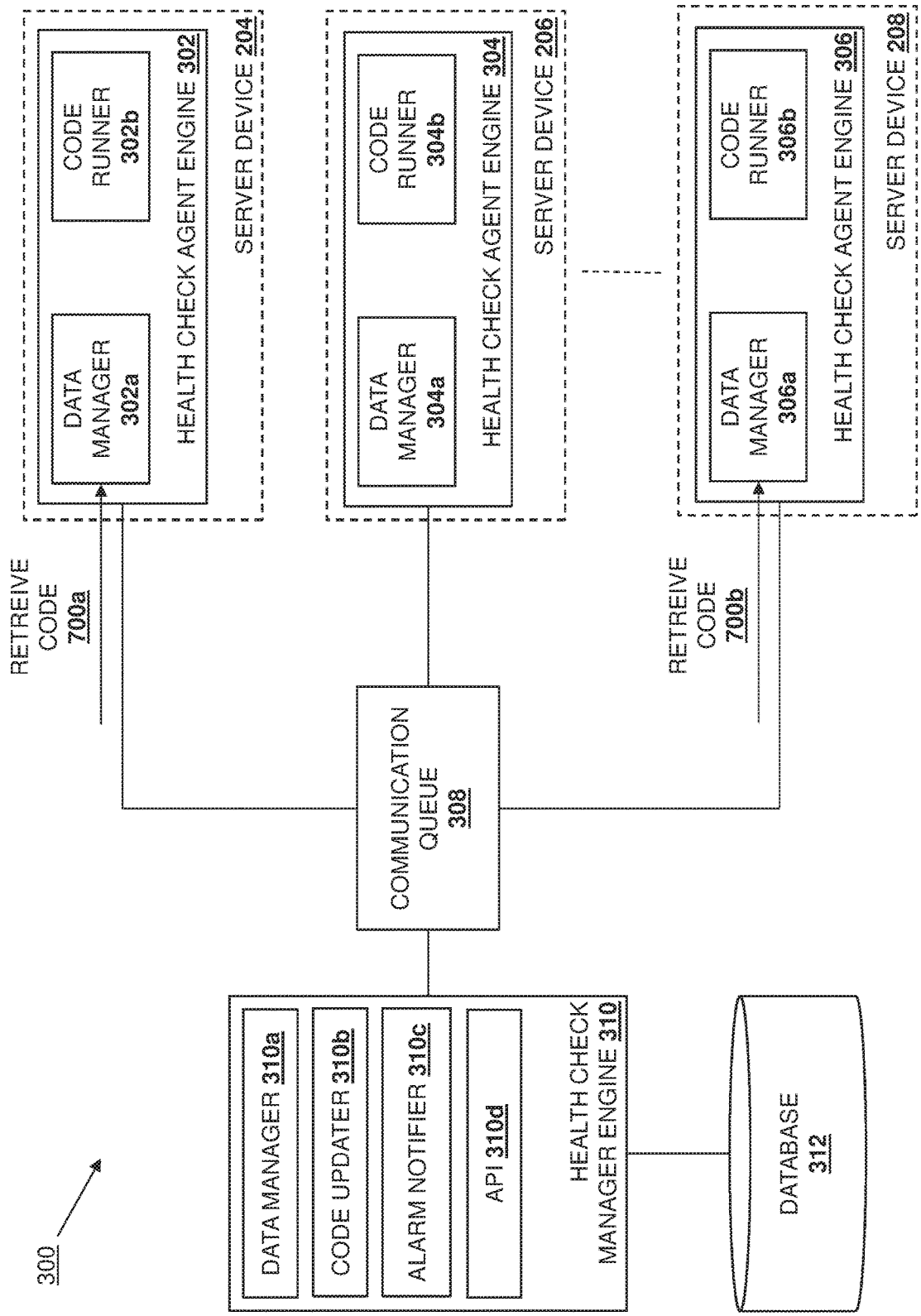
FIG. 7 is a schematic view illustrating an embodiment of monitoring functionality provided in the monitoring system of FIG. 3.
Figure 8:
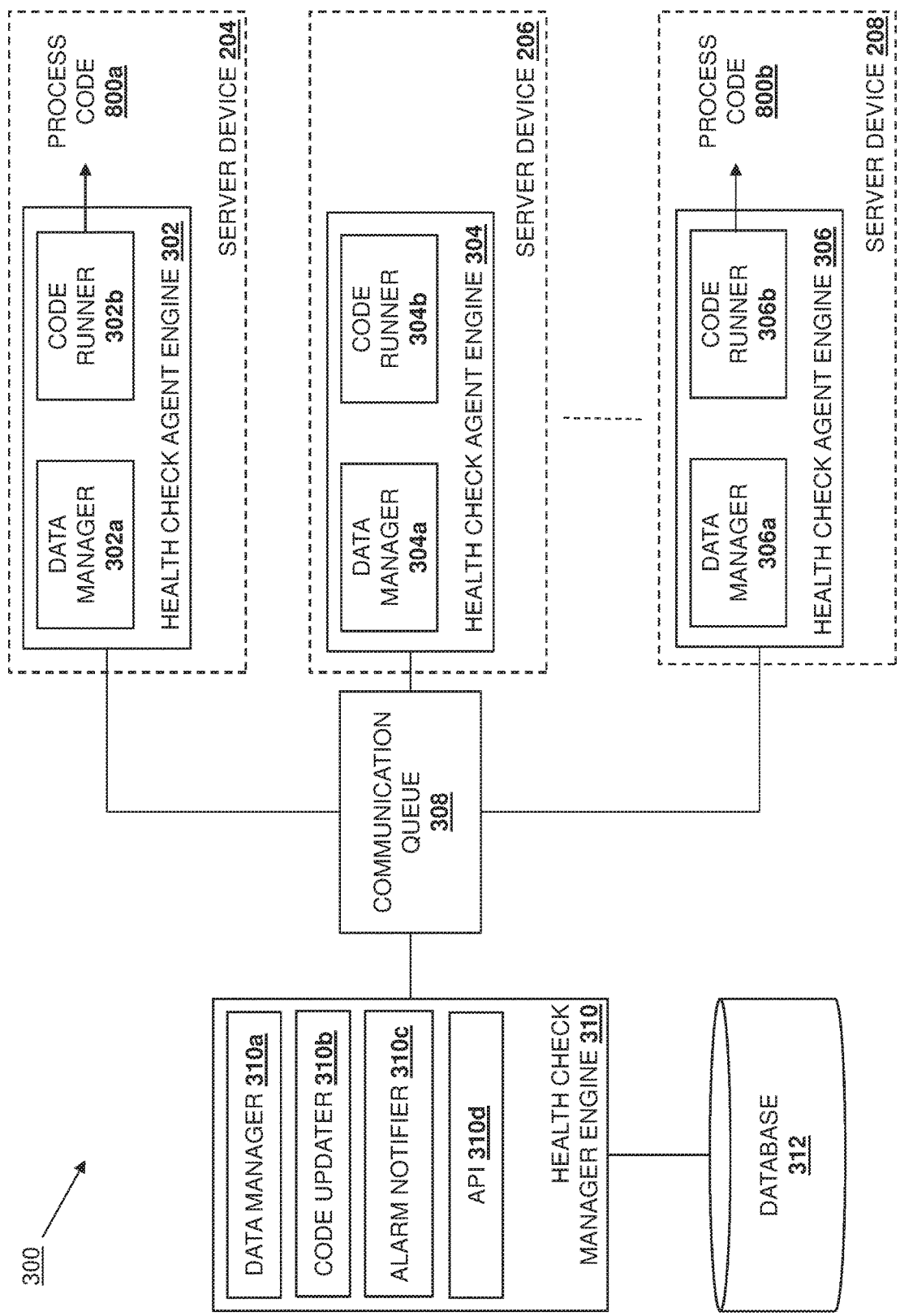
FIG. 8 is a schematic view illustrating an embodiment of monitoring functionality provided in the monitoring system of FIG. 3.

In another example, with reference to FIG. 7, the data manager 302a in the health check agent engine 302 is illustrated as retrieving code 700a in response to determining that code was provided in the communication queue 308 in association with an HCI system identifier for its respective HCI system (i.e., by the health check manager engine 310 at block 402 as discussed above), and the data manager 306a in the health check agent engine 306 is illustrated as retrieving code 700b in response to determining that code was provided in the communication queue 308 in association with an HCI system identifier for its respective HCI system (i.e., by the health check manager engine 310 at block 402 as discussed above). Similarly as discussed above, the code retrieved in the retrieve code operations 700a and 700b discussed above may be new code or code updates while remaining within the scope of the present disclosure. As illustrated in FIG. 8, the data managers 302a and 306a may the pass the code to their corresponding code runners 302b and 306b in the health check agent engines 302 and 306, and the code runners 302b and 306b will process code 800a and 800b. In one example, the processing code 800a and 800b operations may include installing new code and/or executing that new code in order to generate one or more results, as discussed above. For example, processing health check workload scripts/codes may provide for the performance of one or more tasks in core modules provided in the corresponding HCI system, or in custom modules provided for the HCI systems, and multiple health check workload scripts may be executed sequentially. In another example, the processing code 800a and 800b operations may include updating code in the HCI system with code updates. However, while a few examples have been described, one of skill in the art in possession of the present disclosure will recognize that processing code may involve a variety of operations that will fall within the scope of the present disclosure as well.

While described below as code executed to perform health monitoring, components of the health check agent engine 306 may be updated via code retrieved from the communication queue 308 as well. For example, updates to the data manager's 302a-306a and the code runners 302b-306b may be retrieved from the communication queue 308 while remaining within the scope of the present disclosure, and executed to update the data managers and/or code runners. As such, any health check agent engine provided on an HCI system in the HCI cluster 202 may operate according to the method 400 to only retrieve code from the communication queue 308 if that code was provided in the communication queue 308 in association with an HCI system identifier for its respective HCI system, thus eliminating the provisioning of redundant code on HCI systems and/or the respective server devices that provide those HCI systems.

The method 400 then proceeds to decision block 406 where it is determined whether the processing of the first monitoring communications has generated second monitoring communications. In an embodiment, at decision block 404, HCI systems may operate at decision block 406 to determine whether second monitoring communications were generated from the processing of the first monitoring communications. For example, the data managers 302a-306a in the health check agent engines 302-306 may determine at decision block 406 whether the code runners 302b-306c (or the data managers 302a-306a themselves) generated second monitoring communications in response to their processing of the first monitoring communications at block 404. If, at decision block 406, it is determined that the processing of the first monitoring communications does not generate second monitoring communications, the method 400 returns to block 402 and loops back through blocks 402-406 where the manager subsystem provides monitoring communications in the communication queue and the HCI systems retrieve those monitoring communications substantially as discussed above. For example, code updates such as the update of applications in a workload run by an HCI system, the update of a data manager on a health check agent engine, the update of a code runner on a health check agent engine, and/or other communication processing that would be apparent to one of skill in the art in possession of the present disclosure, may not generate any second monitoring communications and, as such, may cause the method 400 to loop back through blocks 402-406.

If, at decision block 406, it is determined that the processing of the first monitoring communications has generated second monitoring communications, the method 400 proceeds to block 408 where the HCI systems provide the second monitoring communications in the communication queue. In an embodiment, at block 408, the HCI systems may provide the second monitoring communications, which were generated from the processing of the first monitoring communications, in the communication queue 308. For example, the data managers 302a-306a may receive any second monitoring communications generated by their respective code runners 302b-306b (or the data managers 302a-306a themselves) and, in response, provide those second monitoring communications in the communication queue 308.

Continuing with the heartbeat communication example provided above, the processing of the heartbeat communications by the code runners 302b and 306b (or the data managers 302a and 306a) may result in the generation of heartbeat communications that respond to those heartbeat communications (a "heartbeat communication response" in the example below). As such, in response to determining that heartbeat communication responses have been generated, the data managers 302a and 306a may provide those heartbeat communication responses in the communication queue 308. In some embodiments, heartbeat communications responses may be provided in the communication queue 308 in association with an identifier for the HCI system that includes the health check agent engine that generated those heartbeat communication responses (e.g., identifiers for the HCI systems provided by the server devices 302 and 306 in this example).

Figure 9:
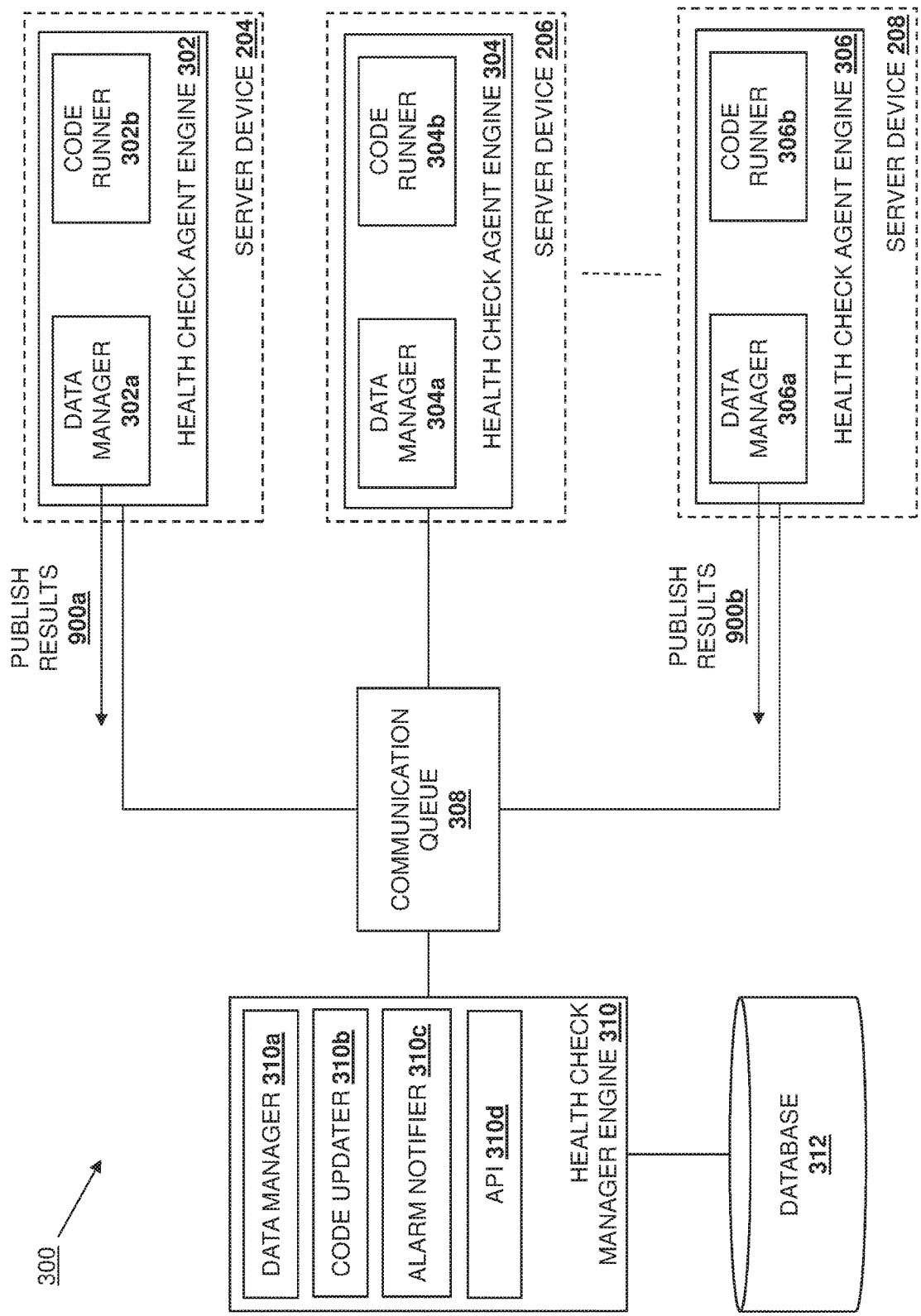
FIG. 9 is a schematic view illustrating an embodiment of monitoring functionality provided in the monitoring system of FIG. 3.

Continuing with the code example provided above, the processing of the code by the code runners 302b and 306b may result in the generation of one or more results. With reference to FIG. 9, in response to determining that their respective code runners 302b and 306b have generated results in response to the execution of code, the data managers 302a and 306a may publish results 900a and 900b in the communication queue 308. In some embodiments, one or more results may be provided in the communication queue 308 in association with an identifier for the HCI system that includes the health check agent engine that generated those results (e.g., identifiers for the HCI systems provided by the server devices 302 and 306 in this example).

The method 400 then proceeds to block 410 where the manager subsystem retrieves the second communications from the communication queue. In an embodiment, at block 410, the manager subsystem 210 may operate to monitor and/or periodically check the communication queue 308 for communications provided by the health check agent engines 302a-306a. For example, the data manager 310a in the health check manager engine 310 provided in the manager subsystem 210 may operate at block 404 to access the communication queue 308, and determine when communications have been provided by the health check agent engine(s) 302a-306a in the communication queue 308. When the data manager 310a in the health check manager engine 310 determines that the communication queue 308 includes a communication from an HCI system, the health check manager engine 310 will retrieve that communication and store it in the database 312.

Continuing with the heartbeat communication example provided above, the retrieval of a heartbeat communication response provided by any of the health check agent engines 302-304 may allow the health check manager engine 310 to determine that the associated HCI system is operating properly. As discussed above, in some embodiments, heartbeat communication responses may be provided in the communication queue 308 in association with an identifier for the HCI system that includes the health check agent engine that generated those heartbeat communication responses, and thus the health check manager engine 310 may determine that an HCI system is operating properly when a heartbeat communication response associated with its HCI system identifier is retrieved from the communication queue 308.

Continuing with the code example provided above, results that are retrieved from the communication queue 308 and that were generated from the processing of the code by the health check agent engines may then be analyzed to determine whether those results require, for example, an administrator to be notified. For example, the data manager 310a in the health check manager engine 310 may pass any results retrieved from the communication queue 208 to the alarm notifier 310c in the health check manager engine 310, and the alarm notifier 310c may analyze those results to determine whether to generate and transmit an alarm to, for example, the administrator device 216. As such, the alarm notifier 310c may be configured to generate alarms or other notifications about various events that may be identified in the results retrieved at block 410. In a specific example, the alarm notifier 310c may filter results to identify such events, filter those events by event type, event level, and/or other event characteristics, and then may generate and transmit alarms via any of a variety of channels to the administrator device 216 (e.g., remote services, email, text message, etc.) Thus, one of skill in the art in possession of the present disclosure will recognize that an administrator may register alarms, add handlers, and/or provide for the filtering of results and generation of alarms in any of a variety of manners that will fall within the scope of the present disclosure.

Thus, systems and methods have been described that provide communication queue middleware between HCI systems that are provided by server devices, and a management subsystem that monitors those HCI systems. For example, a health check manager may provide code and/or other communications in the communication queue, and associate those communications with identifiers for the HCI systems that are meant to consume those communications. Health check agents in the HCI systems may then monitor the communication queue to determine when communications are associated with the identifier for their respective HCI systems and, in response, retrieve those communications. As such, the health check agents may retrieve code provided in the communication queue by the heath check manager for their specific HCI system/server device, and execute the code to produce results. Those results may then be provided by the health check agents in the communication queue for retrieval by the health check manager. As such, a centralized health check manager may distribute code to different HCI systems without the need to provide redundant code on any of those HCI systems, and retrieve results from the execution of that code in an efficient manner as well, via the communication queue middleware that prevents issues such as application coupling, asynchronous messages, and traffic clipping that occur in conventional systems.

In the specific examples above, the HCI distributed monitoring system 300 may provide for the monitoring of the health of the HCI cluster 202, the HCI systems provided on the server devices 204-208, the applications provided via the workloads run by those HCI systems, ports on the server devices 204-28, Application Programming Interfaces (APIs) provided for the HCI systems, Universal Resource Locators (URLs) utilized by the HCI systems, configurations of the HCI systems, and/or other metrics that would be apparent to one of skill in the art in possession of the present disclosure. For example, there are basic level components in a health hierarchy of an HCI system that provide raw health signals (which may be determined via port checks, URL checks, API checks, and metric checks), and those raw health signals may be aggregated to determine the health of an HCI system. In a specific example, in a VSphere ESXI HCI system, a combination of check points (e.g., service ports and metric checks) can be interpreted to determine whether that ESXI HCI system is healthy, and a sum of the total ESXI HCI system health can be aggregated to determine a VxRail HCI cluster health. Furthermore, in addition to HCI system health, the ESXI KPI health may be assessed by, for example, performing a metric check to ensure that resources in the HCI systems are up-to-date. Finally, in addition to services and HCI systems, the health of logical constructs such as applications are typically composed of a heterogeneous set of services and service clusters, and may be determined from the aggregate of the health of their constituent members (along with metric checks or metrics relevant to the entire logical entity.) In the case of non-leaf entities, health may be defined in terms of the health of their dependencies. For example, services and applications often depend on other services for critical pieces of functionality (e.g., a production VSAN cluster cannot function without a functioning NTP server), so it may not make sense to consider a VxRail manager HCI cluster healthy if the NTP server is not healthy.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Hyper-Converged Infrastructure (HCI) monitoring system, comprising:
 a plurality of server devices, wherein each of the plurality of server devices provides a respective Hyper-Converged Infrastructure (HCI) system that is part of an HCI cluster;
 a communication queue that is provided on at least one of the plurality of server devices; and
 a manager subsystem that is provided on at least one of the plurality of server devices, wherein the manager subsystem is configured to:
  provide, in the communication queue, first workload code that is configured to run on a first server device that is included in the plurality of server devices and that is associated with a first HCI system identifier for a first HCI system provided by the first server device,
   wherein the first workload code is configured to function with a first type of server device and the first server device is the first type of server device,
   wherein the first HCI system identifier identifies the first server device as the first type of server device, and
   wherein the first HCI system is configured to access the communication queue, retrieve the first workload code in response to the first workload code being associated with the first HCI system identifier, execute the first workload code, and provide one or more first results from the execution of the first workload code to the communication queue;
  provide, in the communication queue, second workload code that is configured to run on a second server device that is included in the plurality of server devices and that is associated with a second HCI system identifier for a second HCI system provided by the second server device,
   wherein the second workload code is configured to function with a second type of server device and the second server device is the second type of server device,
   wherein the second HCI system identifier identifies the second server device as the second type of server device, and
   wherein the second HCI system is configured to access the communication queue, retrieve the second workload code in response to the second workload code being associated with the second HCI system identifier, execute the second workload code, and provide one or more second results from the execution of the second workload code to the communication queue;
  retrieve, from the communication queue, the one or more first results provided by the first HCI system;
  retrieve, from the communication queue, the one or more second results provided by the second HCI system;
  report, to an administrator device, at least one of the one or more first results provided by the first HCI system; and
  report, to the administrator device, at least one of the one or more second results provided by the second HCI system.

2. The HCI monitoring system of claim 1, wherein the manager subsystem is configured to:
 provide, in the communication queue, a first heartbeat communication that is associated with the second HCI system identifier for the second HCI system provided by the second server device included in the plurality of server devices, wherein the second HCI system is configured to access the communication queue, retrieve the first heartbeat communication in response to that workload code being associated with the second HCI system identifier, and provide a second heartbeat communication to the communication queue;
 retrieve, from the communication queue, the second heartbeat communication provided by the second HCI system; and
 determine, in response to retrieving the second heartbeat communication, that the second HCI system is operating.

3. The HCI monitoring system of claim 1, wherein the manager subsystem is configured to:
 determine that the second HCI system provided on the second server device that is included in the plurality of server devices requires a workload update; and
 provide, in the communication queue, workload update code that is configured to run on the second server device and that is associated with the second HCI system identifier for the second HCI system,
  wherein the workload update code is configured to function with the second type of server device and the second server device is the second type of server device,
  wherein the second HCI system identifier identifies the second server device as the second type of server device, and
  wherein the second HCI system is configured to access the communication queue, retrieve the workload update code in response to the workload update code being associated with the second HCI system identifier, and use the workload update code to update a workload provided on the second HCI system.

4. The HCI monitoring system of claim 1, wherein the reporting the at least one of the one or more results provided by the first HCI system includes:
providing, to the administrator device, an alarm that is based on the at least one of the one or more results by the first HCI system.

5. The HCI monitoring system of claim 1, wherein the first workload code and the second workload code are each configured to provide substantially similar health check functionality, with the first workload code configured to run on the first server device and not the second server device, and the second workload code configured to run on the second server device and not the first server device.

6. An Information Handling System (IHS), comprising:
a processing system; and
a memory system that is coupled to the processing system and that includes instructions that, when executed by the processing system, cause the processing system to provide a manager engine that is configured to:
provide, in a communication queue, first workload code that is configured to run on a first server device and that is associated with a first HCI system identifier for a first HCI system provided by the first server device,
wherein the first workload code is configured to function with a first type of server device and the first server device is the first type of server device,
wherein the first HCI system identifier identifies the first server device as the first type of server device, and
wherein the first HCI system identifier is configured to identify to the first HCI system to retrieve the first workload code from the communication queue and execute that first workload code to generate one or more first results;
provide, in the communication queue, second workload code that is configured to run on a second server device and that is associated with a second HCI system identifier for a second HCI system provided by the second server device,
wherein the second workload code is configured to function with a second type of server device and the second server device is the second type of server device,
wherein the second HCI system identifier identifies the second server device as the second type of server device, and
wherein the second HCI system identifier is configured to identify to the second HCI system to retrieve the second workload code from the communication queue and execute that second workload code to generate one or more second results;
retrieve, from the communication queue, the one or more first results generated by the first HCI system and provided by the first HCI system to the communication queue;
retrieve, from the communication queue, the one or more second results generated by the second HCI system and provided by the second HCI system to the communication queue;
report, to an administrator device, at least one of the one or more first results provided by the first HCI system; and
report, to the administrator device, at least one of the one or more second results provided by the second HCI system.

7. The IHS of claim 6, wherein the manager engine is configured to:
provide, in the communication queue, a first heartbeat communication that is associated with the second HCI system identifier for the second HCI system provided by the second server device, wherein the second HCI system identifier is configured to identify to the second HCI system to generate a second heartbeat communication;
retrieve, from the communication queue, the second heartbeat communication generated by the second HCI system and provided by the second HCI system to the communication queue; and
determine, in response to retrieving the second heartbeat communication, that the second HCI system is operating.

8. The IHS of claim 6, wherein the manager engine is configured to:
determine that the second HCI system provided on the second server device requires a workload update; and
provide, in the communication queue, workload update code that is configured to run on the second server device and that is associated with the second HCI system identifier for the second HCI system,
wherein the workload update code is configured to function with the second type of server device and the second server device is the second type of server device,
wherein the second HCI system identifier identifies the second server device as the second type of server device, and,
wherein the second HCI system identifier is configured to identify to the second HCI system to retrieve the workload update code from the communication queue and use the first workload code to update a workload provided on the second HCI system.

9. The IHS of claim 6, wherein the reporting the at least one of the one or more first results provided by the first HCI system includes:
providing, to the administrator device, an alarm that is based on the at least one of the one or more first results by the first HCI system.

10. The IHS of claim 6, wherein the first workload code and the second workload code are each configured to provide substantially similar health check functionality, with the first workload code configured to run on the first server device and not the second server device, and the second workload code configured to run on the second server device and not the first server device.

11. The IHS of claim 6, wherein the processing system and the memory system are provided in the first server device, and wherein the memory system includes instructions that, when executed by the processing system, cause the processing system to provide the first HCI system.

12. A method for monitoring Hyper-Converged Infrastructure (HCI) systems, comprising:
providing, by a manager subsystem in a communication queue, first workload code that is configured to run on a first server device and that is associated with a first HCI system identifier for a first HCI system provided by the first server device,
wherein the first workload code is configured to function with a first type of server device and the first server device is the first type of server device,
wherein the first HCI system identifier identifies the first server device as the first type of server device, and wherein the first HCI system identifier is configured to identify to the first HCI system to retrieve the first workload code from the communication queue and execute that first workload code to generate one or more first results;
providing, by the manager subsystem in the communication queue, second workload code that is configured to run on a second server device and that is associated with a second HCI system identifier for a second HCI system provided by the second server device,
wherein the second workload code is configured to function with a second type of server device and the second server device is the second type of server device,
wherein the second HCI system identifier identifies the second server device as the second type of server device, and
wherein the second HCI system identifier is configured to identify to the second HCI system to retrieve the second workload code from the communication queue and execute that second workload code to generate one or more second results;
retrieving, by the manager subsystem from the communication queue, the one or more first results generated by the first HCI system and provided by the first HCI system to the communication queue;
retrieving, by the manager subsystem from the communication queue, the one or more second results generated by the second HCI system and provided by the second HCI system to the communication queue;
reporting, by the manager subsystem to an administrator device, at least one of the one or more first results provided by the first HCI system; and
reporting, by the manager subsystem to the administrator device, at least one of the one or more second results provided by the second HCI system.

13. The method of claim 12, further comprising:
providing, by the manager subsystem in the communication queue, a first heartbeat communication that is associated with the second HCI system identifier for the second HCI system provided by the second server device, wherein the second HCI system identifier is configured to identify to the second HCI system to generate a second heartbeat communication;
retrieving, by the manager subsystem from the communication queue, the second heartbeat communication generated by the second HCI system and provided by the second HCI system to the communication queue; and
determining, by the manager subsystem in response to retrieving the second heartbeat communication, that the second HCI system is operating.

14. The method of claim 12, further comprising:
determining, by the manager subsystem, that the second HCI system provided on the second server device requires a workload update; and
providing, by the manager subsystem in the communication queue, workload update code that is configured to run on the second server device and that is associated with the second HCI system identifier for the second HCI system,
wherein the workload update code is configured to function with the second type of server device and the second server device is the second type of server device,
wherein the second HCI system identifier identifies the second server device as the second type of server device, and
wherein the second HCI system identifier is configured to identify to the second HCI system to retrieve the workload update code from the communication queue and use the first workload code to update a workload provided on the second HCI system.

15. The method of claim 12, wherein the reporting the at least one of the one or more first results provided by the first HCI system includes:
providing, by the manager subsystem to the administrator device, an alarm that is based on the at least one of the one or more first results by the first HCI system.

16. The method of claim 12, wherein the first workload code and the second workload code are each configured to provide substantially similar health check functionality, with the first workload code configured to run on the first server device and not the second server device, and the second workload code configured to run on the second server device and not the first server device.

17. The method of claim 12, wherein the manager subsystem and the first HCI system are provided on the first server device.

* * * * *